(12) United States Patent
Meng

(10) Patent No.: US 11,873,052 B2
(45) Date of Patent: *Jan. 16, 2024

(54) QUICK CONNECT AND DISCONNECT LATCH MECHANISM FOR MOUNTING ACCESSORIES ON OFFROAD VEHICLES

(71) Applicant: Zhejiang CFMOTO Power Co., Ltd., Zhejiang (CN)

(72) Inventor: Jinli Meng, Hangzhou (CN)

(73) Assignee: Zhejiang CFMoto Power Co. Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,408

(22) Filed: Feb. 28, 2023

(65) Prior Publication Data

US 2023/0202600 A1 Jun. 29, 2023

Related U.S. Application Data

(63) Continuation of application No. 17/332,676, filed on May 27, 2021, now Pat. No. 11,618,521.

(30) Foreign Application Priority Data

Jul. 9, 2020 (CN) .......................... 202021346212.2

(51) Int. Cl.
*B62J 9/27* (2020.01)
*B62J 9/02* (2006.01)
*B62J 9/24* (2020.01)

(52) U.S. Cl.
CPC .. *B62J 9/02* (2013.01); *B62J 9/24* (2020.02)

(58) Field of Classification Search
CPC .. B60P 7/14; B60P 7/15; B60P 7/0815; B60P 7/0807; B60P 7/08; B61D 45/001; B62D 53/08; F16B 21/02; F16B 37/045; F16B 12/2009; F16B 19/109; F16B 21/14; B62J 9/27; B62J 9/24
See application file for complete search history.

(56) References Cited

U.S. PATENT DOCUMENTS

| | | | |
|---|---|---|---|
| 3,145,441 | A | 8/1964 | Strandrud |
| 5,123,795 | A | 6/1992 | Engel et al. |
| 6,267,543 | B1 | 7/2001 | David et al. |
| 7,055,454 | B1 | 6/2006 | Whiting et al. |
| 7,222,582 | B1 | 5/2007 | Whiting et al. |
| 7,975,640 | B1 | 7/2011 | Whiting et al. |
| 8,267,034 | B2 | 9/2012 | Whiting et al. |
| 8,813,673 | B2 | 8/2014 | Whiting et al. |

(Continued)

*Primary Examiner* — Corey N Skurdal
(74) *Attorney, Agent, or Firm* — Shewchuk IP Services, LLC; Jeffrey D. Shewchuk

(57) ABSTRACT

A latching mechanism removably attaches an accessory to an offroad vehicle without requiring tools. The latching mechanism includes a body, a shaft extending through the body, and a handle riding on a conical surface of the body for rotating the shaft relative to the body. An oblong head extends on a lower side of the body, rotatable by the handle and shaft to a position where the head extends under a shoulder of a mounting recess. A spring system biases the head axially, such that the head can be moved either upwardly or downwardly from a balanced elevation set by a nut tightenable on a bolt. The mounting recess has an upper portion shaped differently from a lower portion. The body includes a hooking portion which extends significantly above the top of the mounting recess.

18 Claims, 6 Drawing Sheets

(56) References Cited

U.S. PATENT DOCUMENTS

| | | |
|---|---|---|
| 9,366,280 B2 | 6/2016 | Whiting et al. |
| 9,505,335 B2 | 11/2016 | Massicotte et al. |
| 9,511,704 B2 | 12/2016 | Massicotte et al. |
| 9,751,592 B2 | 9/2017 | Labbe et al. |
| 9,919,657 B2 | 3/2018 | Benedict et al. |
| 10,597,121 B2 | 3/2020 | Morgan et al. |
| 11,235,829 B2 | 2/2022 | Robillard et al. |
| 2013/0094920 A1 | 4/2013 | Massicotte et al. |

QUICK CONNECT AND DISCONNECT LATCH MECHANISM FOR MOUNTING ACCESSORIES ON OFFROAD VEHICLES

CROSS-REFERENCE TO RELATED U.S. APPLICATION(S)

This is a continuation of U.S. patent application Ser. No. 17/332,676 filed May 27, 2021, now granted as U.S. Pat. No. 11,618,521.

FIELD OF THE INVENTION

The present invention relates to offroad vehicles such as utility vehicles ("UVs") and all-terrain vehicles ("ATVs"), and particularly structures and systems for users to removably mount various accessories onto such vehicles.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

With the many different uses of such vehicles, it is not surprising that there are a wide variety of accessories that users may wish to mount to their vehicle for a particular drive, trip or type of use, such as on top of the frame or storage rack of the vehicle behind the driver's seat. Generally speaking, users would prefer to be able to mount such accessories without the requirement for using tools such as a wrench or screwdriver. For instance, additional fuel containers, cargo containers or panniers are types of accessories that could be attached to the vehicle using ropes, cords or tie-downs. It is not always easy to find a space having the ideal shape or size for carrying particular objects, to adequately secure such objects using ropes or cords, or to find a hook or structure for securing an object or container to the vehicle in the desired location. Accordingly, containers and other objects can be better attached with an accessory attachment system using various hand-operated latch mechanisms and anchors. U.S. Pat. Nos. 7,055,454, 7,222,582, 7,975,640, 8,267,034, 8,813,673, 9,366,280, 9,505,335, 9,511,704, 9,751,592, 9,919,657 and 10,597,121, all incorporated by reference for their teaching of the problem and environment of use, show prior art types of detachable latching systems used on off-road vehicles. However, existing hand-operated latch mechanisms and anchors have various drawbacks and problems, and better options are needed.

BRIEF SUMMARY OF THE INVENTION

The present invention is a latching mechanism for removably attaching an accessory to an offroad vehicle without requiring tools, as well as a system and method utilizing the latching mechanism. The latching mechanism includes a body, a shaft extending through the body, and a handle for rotating the shaft relative to the body. The handle extends on an upper side of the body so as to be hand manipulatable by a user while the body is held by a mounting recess. An oblong head extends on a lower side of the body, rotatable by the shaft to a position where the head extends under a shoulder of the mounting recess to secure the body into to the mounting recess. In one aspect, the latching mechanism includes a spring system for biasing the head axially, such that the head can be moved either upwardly or downwardly from a balanced elevation against either a downward biasing force or an upward biasing force of the spring system. The spring system can be mounted on a bolt, with a nut tightenable on the bolt to adjust the balanced elevation. In another aspect, the handle rides on a conical upper surface of the body, sloped downwardly and outwardly from the rotation axis so as to reduce entry of muddy water and reduce contact surface wear between the handle and the body. In another aspect, the mounting recess has an upper portion shaped differently from a lower portion, allowing a more compact latching mechanism profile. In yet another aspect, the body including a hooking portion which extends significantly above the top of the mounting recess, so the accessory can be slid in under the hooking portion of a first, already-tightened latching mechanism before being secured using a second, identically-shaped latching mechanism.

BRIEF DESCRIPTION OF THE DRAWINGS

The present invention is described with reference to the attached drawing sheets, in which.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figures 1, 2:
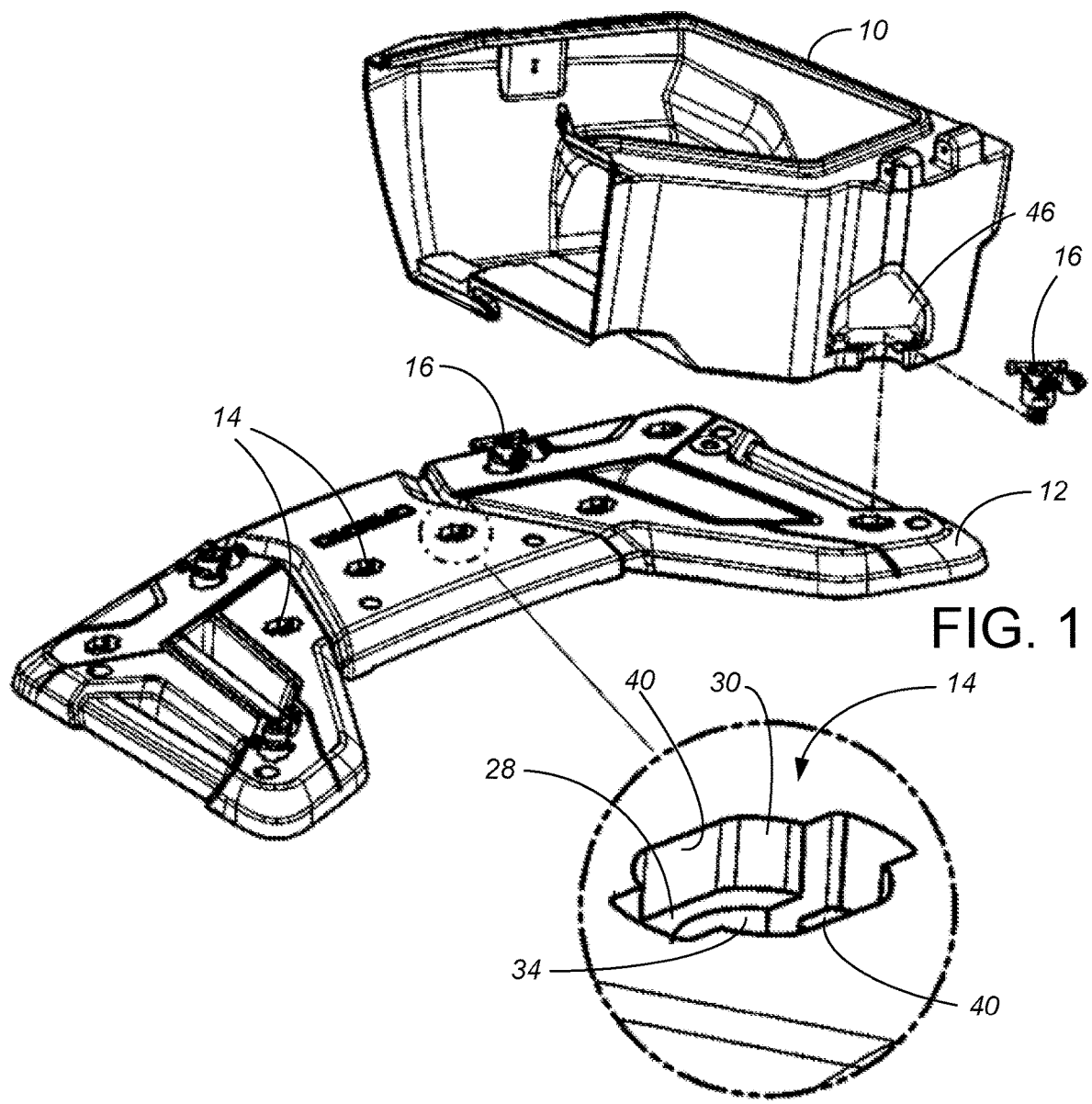
FIG. 1 is a perspective view showing example locations of using the latch mechanism of the present invention to attach a container on an ATV rack.
FIG. 2 is an enlarged view showing one of the recessed anchor locations for the latch mechanism of the present invention.

The invention relates to a latching system for quickly attaching or detaching accessories to an off road vehicle such as a UV or ATV without the use of any tools, but could also be used for other types of off road vehicles such as snowmobiles and watercraft. For instance, FIG. 1 shows an exemplary use, in attaching a removable hard sided travel case 10 to a composite-over-steel rack 12. The rack 12 shown is a rear rack for a straddle-type ATV such as that shown in U.S. Pat. No. D896,706, incorporated by reference. With this particular configuration of rack 12, a total of ten mounting recesses 14 are provided in the rack 12. FIG. 1 shows four latching mechanisms 16, with six of the mounting recesses 14 shown vacant. The number and positioning of the mounting recesses 14 is a matter of design choice for the vehicle and accessories intended to be mounted thereto. The number of latching mechanisms 16 and mounting recesses 14 used for any given accessory depends upon the size and, in some instances, weight or height of the accessory. While the preferred rack 12 has all the mounting recesses 14 facing upward, other orientations of mounting recesses can alternatively be used, for mounting accessories off the sides or bottom surfaces on the vehicle. For ease of description, however, the terms "top", "bottom" "upper", "lower" etc. as used herein refer to the orientation of the latching mechanism relative to the mounting recess, i.e, the "bottom" of the latching mechanism 16 extends into the mounting recess 14 even if the mounting recess were flipped over so as to hold an accessory beneath a portion of the vehicle.

Figure 3:
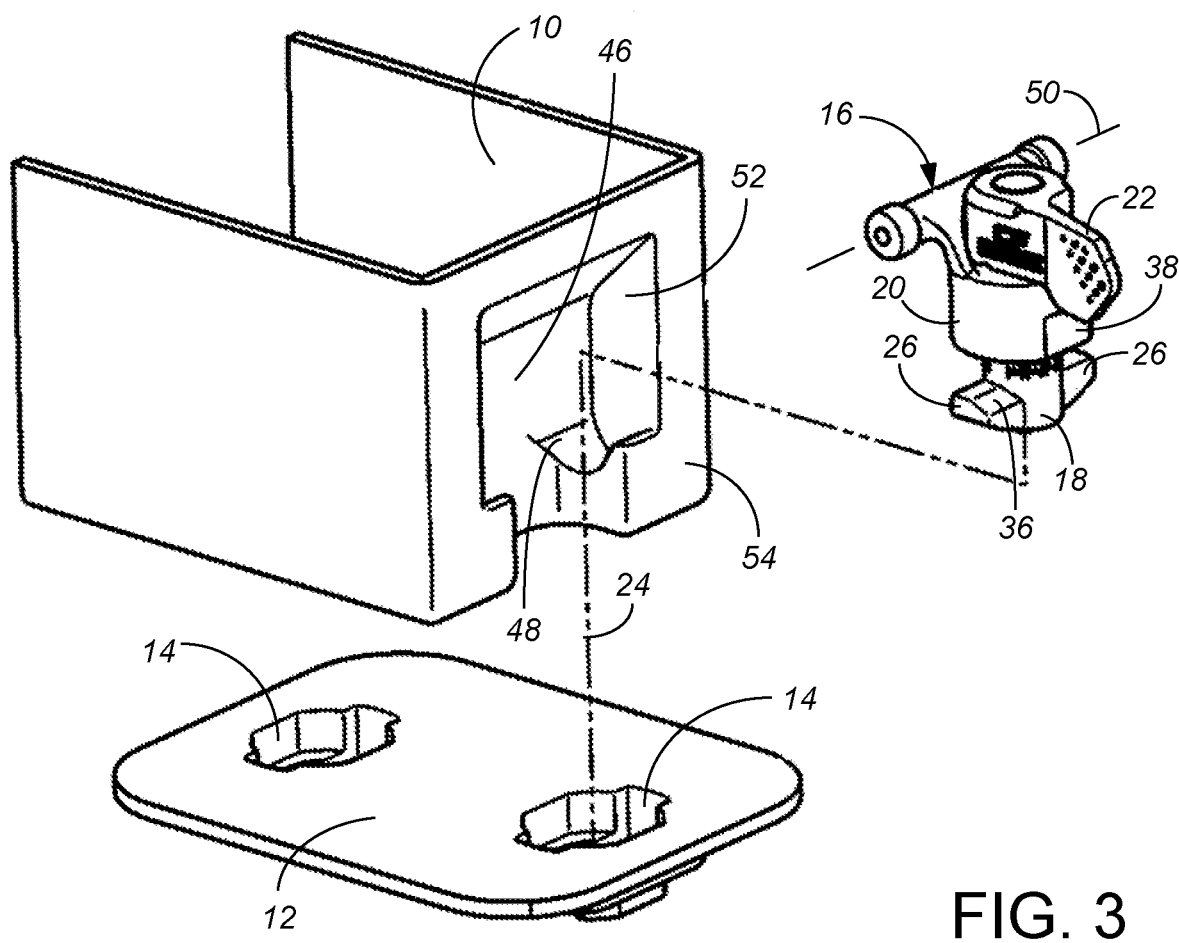
FIG. 3 is a perspective view showing use of the latch mechanism of FIG. 1.
Figure 4:
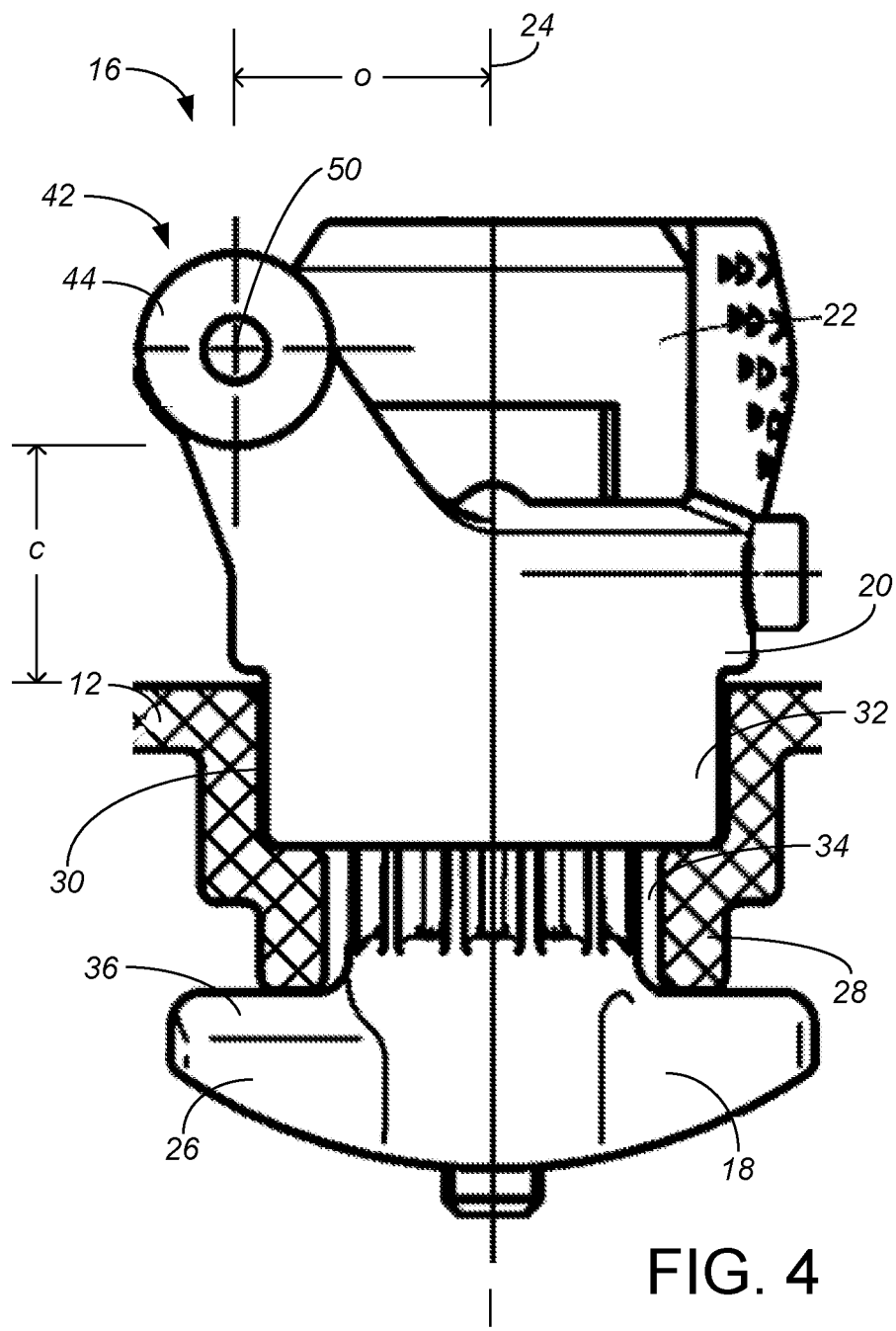
FIG. 4 is an enlarged side view showing the latch mechanism of FIGS. 1 and 3 in a secured or tightened position.

Each mounting recess 14 has an oblong shape sized and shaped to receive a T-bolt head 18 of a latching mechanism 16, with the preferred shape for mounting recesses 14 better shown in FIGS. 2 and 3. In addition to the T-bolt head 18, the latching mechanism 16 includes a body 20 and a handle 22. The handle 22 is fixed to the T-bolt shaft which resides inside the body 20, so the handle 22 and the T-bolt head 18 can be jointly pivoted about the rotational axis 24 while the body 20 remains stationary. Because the mounting recess 14 and the T-bolt head 18 are both oblong and longer than they are wide, after insertion the rotation of the T-bolt head 18 causes the extending portions 26 of the T-bolt head 18 to extend underneath the narrower shoulders 28 of the mounting recess 14, holding the latching mechanism 16 down into its mounting recess 14. The preferred mounting recesses 14 are step holes, having an upper section 30 shaped to receive the lower portion 32 of the body 20 and a lower through-hole 34 shaped to receive the T-bolt head 18. Alternatively, the lower portion of the body could be shaped in plan view similarly or identically to the T-bolt head 18 or using downwardly extending tabs within the profile of the T-bolt head as described in U.S. Pat. No. 9,511,704, incorporated by reference, to be used with mounting recesses omitting the step.

The upper surface of the extending portions 26 of the T-bolt head 18 includes ramps 36 which when sliding against the bottom of the shoulders 28 push the T-bolt head 18 downwardly. The preferred ramps 36 are about 4 mm in elevation. Alternatively, the upper surface of the extending portions of the T-bolt head can be shaped similarly to the cammed T-bolt head described in U.S. Pat. No. 9,511,704, incorporated by reference.

In the preferred embodiment, the body 20 is primarily cylindrical about the rotational axis 24, such as a diameter of about 32 mm. The body 20 preferably includes a portion which is not cylindrical, such as at least one flat 38, mating relative to at least one corresponding flat 40 of the mounting recess 14. The body 20 also includes an upwardly extending hooking portion 42, with the preferred embodiment including two horizontally oriented prongs 44 to provide the hooking portion 42. The hooking portion 42 mates into a correspondingly shaped hook receiving portion 46 on the accessory 10. In the preferred embodiment, the hook receiving portion 46 includes two curved bottom walls 48 spaced a clamping distance c above the generally planar bottom surface of the accessory 10. The preferred rack 12 has a generally planar top surface, and when the body 20 is positioned into the mounting recess 14, the bottom of the horizontally oriented prongs 44 are the same height as the clamping distance c above the generally planar bottom surface. In the most preferred embodiment, the clamping distance c is about 14 mm. The most preferred horizontally oriented prongs 44 are about 12 mm in diameter, extending over a length 1, which is preferably within a range of ½ to five times the clamping distance c in each direction. In the most preferred embodiment, the prongs 44 extend for a length 1 of about 30 mm in each direction, i.e., providing an overall length of the latching mechanism 16 of about 60 mm. The axis 50 for the prongs 44 is preferably offset from the rotational axis 24 by an offset distance o, which is within a range of ½ to twice the clamping distance c. In the most preferred embodiment, the offset distance o is about 16 mm. While attaching an accessory 10 to the vehicle, the orientation of the prongs 44, mating into the hook receiving portion 46 on the accessory 10, help the user in aligning the body 20 into the mounting recess 14.

Note that the arrangement of the present invention, including a non-negligible value greater than 5 mm for each of the clamping distance c, the hook length 1 and the offset distance o, significantly spaces the location that the clamping forces are applied (at the bottom of the outer edges of the prongs 44) from the point where the rotational axis 24 intersects the plane defined by the top surface of the rack 12/bottom surface of the accessory 10. This allows many of the forces transmitted between the vehicle and the accessory to be spread out and withstood as moments with significant moment arms, rather than merely as a pull force downward at, centered on, or immediately around the mounting recess 14. The latching mechanism 16 of the present invention uses this benefit to provide a significantly stronger clamping arrangement than prior art latching mechanisms.

The accessories which are being mounted to the vehicle preferably receive the hooking portion 42 in an inwardly extending concave mounting opening 52. For instance, the mounting opening 52 can extend inwardly from a wall 54 of the accessory 10, a sufficient distance to generally or nearly align the rotational axis 24 in line with the accessory wall 54. Using such an inwardly extending concave mounting opening 52 helps to spread the mounting force along the wall 54, leading to a more secure clamping of the accessory 10 to the rack 12 and vehicle.

A secondary location to use one or more of the latching mechanisms 16 is under the accessory 10, depicted toward the back center of FIG. 1 (toward the front of the vehicle, nearest the driver's seat). This is possible because the prongs 44 are a significant clamping distance c (such as at least 5 mm) above the top planar surface of the rack 12, and because the prongs 44 do not extend all the way around the mounting recess 14. The curved bottom walls 48 of the accessory which contact the prongs 44 can accordingly be raised with a gap distance g above the rack 12. The gap distance g allows the accessory 10 to be slid in sideways underneath the prongs 44 of one or more of the latching mechanisms 16 even after such latching mechanisms 16 have been tightened into their mounting recesses 14 in the rack 12. Thus as exemplified in FIG. 1, one mounting method for the accessory 10 is to first tighten at least one latching mechanism 16 to the rack 12, then to place the accessory 10 over the tightened latching mechanism 16, sliding the accessory 10 in sideways under the prongs 44, then to place at least one second latching mechanism 16 over a portion of the accessory 10 and down into its mounting recess 14 and tighten the second latching mechanism 16 to fully secure the accessory 10. With the narrow (or non-existent) gaps provided by prior art latching mechanisms, such a mounting method was not possible, but instead mounting and removal of the accessory require all of the prior art latching mechanisms being used for that accessory to be loosened and/or removed from their mounting recesses.

The handle 22 should be long enough extending away from the rotational axis 24 to enable hand tightening of the latching mechanism 16. In the most preferred embodiment, the handle length is about 47 mm, so the distal end of the handle 22 extends about 31 mm beyond the radius of the body 20. The sides of the handle 22 which are contacted by the user's fingers to tighten or loosen/remove the latching mechanism 16 may include a texture pattern for better grip. While somewhat longer or shorter throws could be used, the handle 22 preferably has a 90° throw θ for 90° rotation of the T-bolt head 18, best understood with reference to FIG. 5. When loosened, the handle 22 should extend generally opposite the prongs 44. When tightened, the handle 22 should be nearly parallel to and somewhat close to the prongs 44, but still have enough room for the user's fingers to fit behind the handle 22 and push or pull the handle 22 in the opening direction. For instance, the most preferred embodiment positions the handle 22 in the tightened position at a slight angle α relative to the prong axis 50. In the most preferred embodiment, the latched handle angle α is 14°, and the spacing s between the distal end of the handle 22 and the prongs 44 is about 25 mm. By having the handle 22 in the closed position be closer to the prongs 44 than it is in the opened position, the handle 22 is less likely to inadvertently snag on passing objects and less likely to inadvertently come open during use.

With the most preferred dimensions as described, the body 20, the handle 22 and the T-bolt head 18 can all be molded of a hard polymer material, such as a polyamide (nylon) 6 polymer with a 20% glass fill, performing well in the rugged environment of use with off-road vehicles to withstand the required mounting stresses. In particular, at the shapes, dimensions and materials of the most preferred embodiment, the static pull strength of the latching mechanism 16 is in excess of 2000N, such as a tested static pull strength of 3180N. This vastly exceeds the static pull strength of a prior art latch mechanism tested to have a static pull strength of 1370N. At the same time, the latching mechanism 16 is quite compact in volume, low in cost and relatively easy to manufacture.

Figure 5:
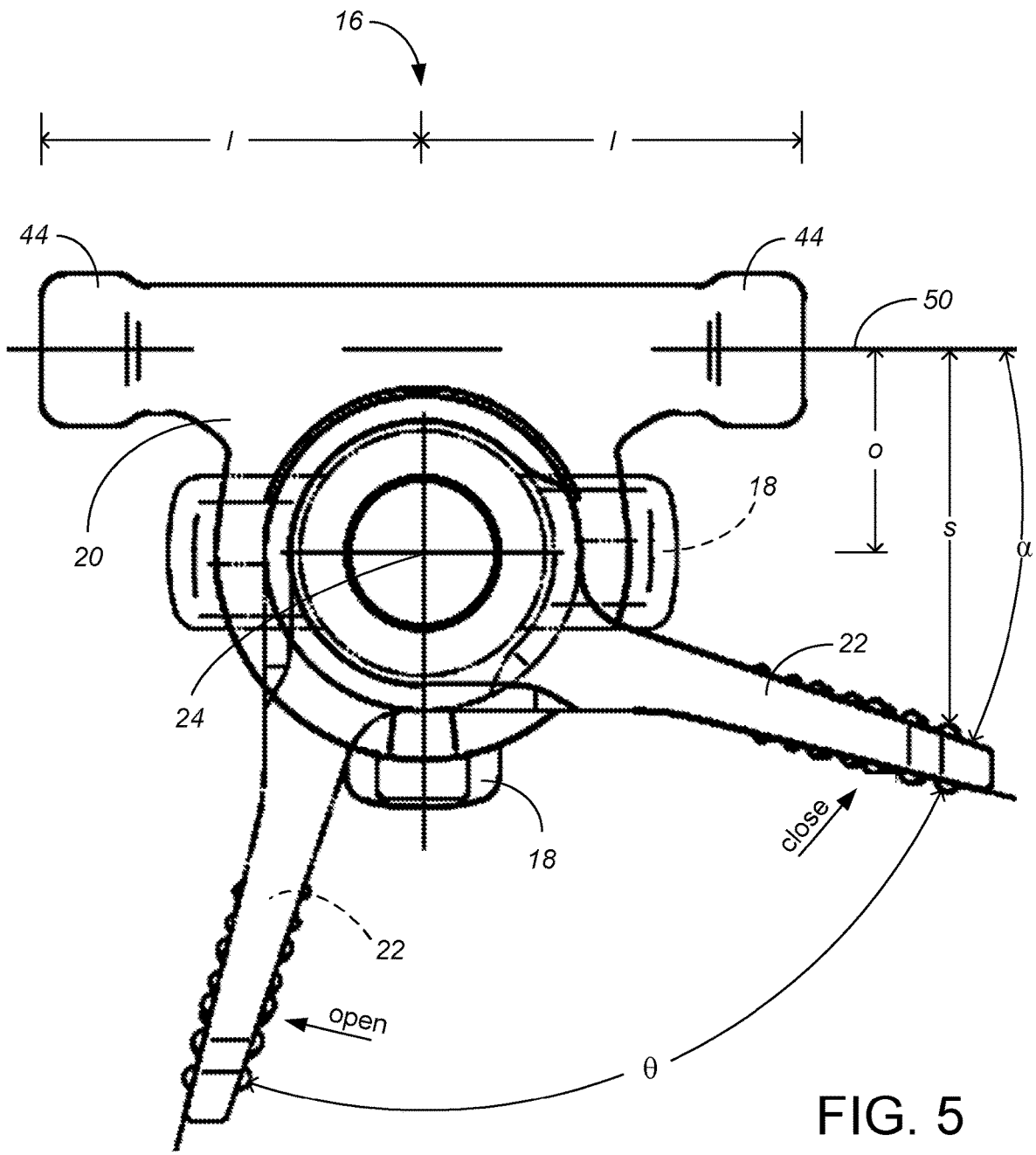
FIG. 5 is an enlarged top plan view, showing movement of the latch handle and T-bolt head between the unsecured, loosened position and the secured, tightened position.
Figure 6:
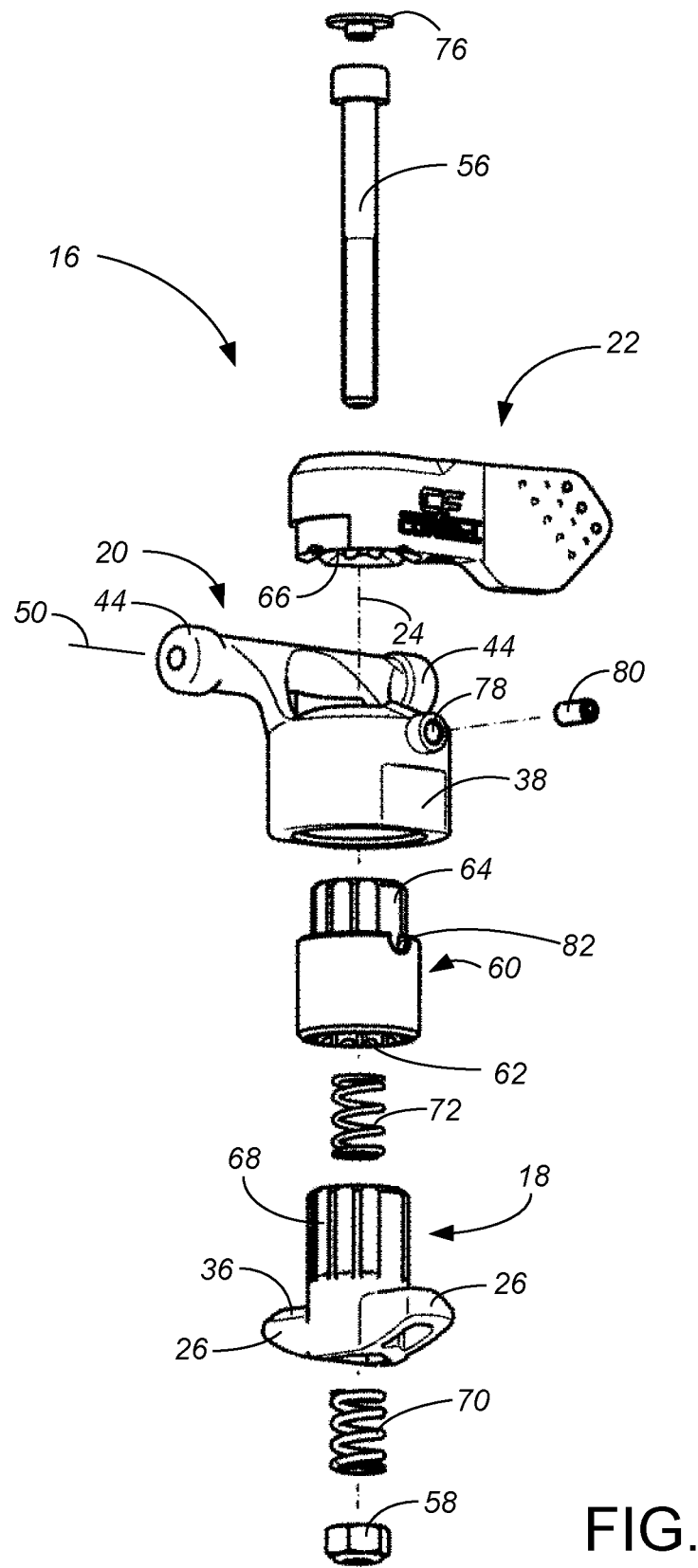
FIG. 6 is an exploded perspective view of the latch mechanism of FIGS. 1 and 3-5.

The various components which are assembled together to make up the latching mechanism 16 are better shown in FIGS. 5 and 6. In the preferred assembly, the handle 22 is attached to the T-bolt head 18 using a bolt 56, such as a M6×55 304 stainless steel machine screw 56 with a corresponding nut 58.

An intermediate connecting shaft portion 60 is assembled around the bolt 56 The preferred connecting shaft portion 60 include inner splines 62 and outer splines 64 which mate into corresponding inner splines 66 of the handle 22 and outer splines 68 of the T-bolt head 18, to transfer torque and rotation from the handle 22 through the connecting shaft portion 60 to the T-bolt head 18.

The T-bolt head 18 can preferably float to some degree in the vertical direction relative to the body 20 and handle 22, such as by being held in its vertical position between a pressed spring 70 and a balance spring 72. The splines 62, 68 should be long enough in the axial direction to account for this float distance. In manufacturing the rack 12 and the recess 14, there may be some degree of dimensional inaccuracy. Additionally, there may be abrasion to the rack 12 and/or the bottom surface and/or the T-bolt head 18 during long term use. With the preferred embodiment, the bolt 56 can be tightened or loosened relative to the nut 58 to decrease or increase the lock size range. The pressed spring 70 and the balance spring 72 realize up-down balance, so that T-bolt head 18 can always be vertically positioned and pushing upward to make a consistent clamping force. The preferred structure with the pressed spring 70 and balance spring 72 allows a total float in the vertical direction of about 8 mm, 4 mm up and 4 mm down from the balanced position shown in FIG. 7. With the preferred ramps 36 being about 4 mm in elevation, rotation of the handle 22 can cause lowering of the T-bolt head 18 by at most 4 mm through additional compression of the pressed spring 70.

Figure 7:
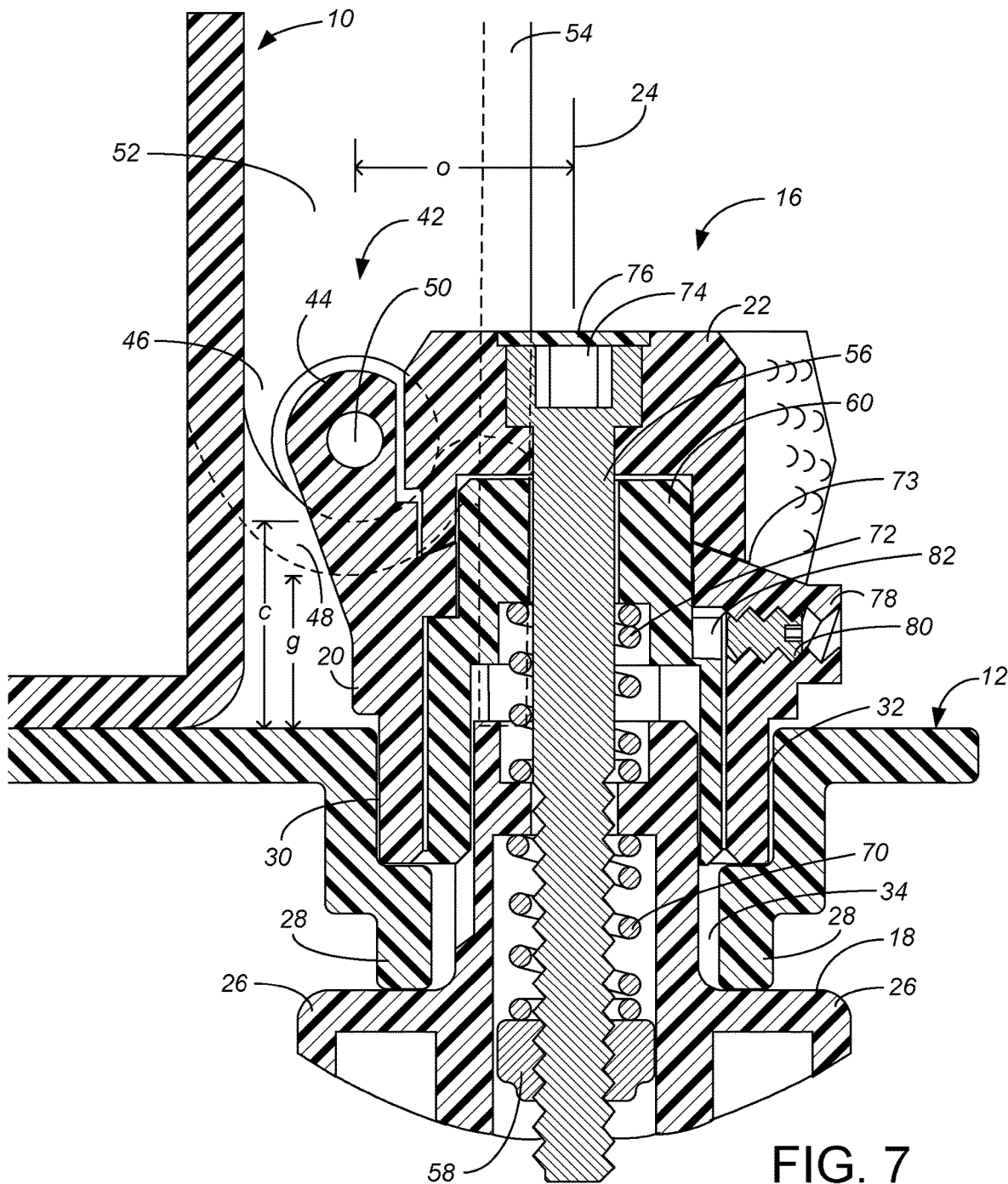
FIG. 7 is a cross-sectional side view of the latch mechanism in the secured, tightened position, taken through the rotational axis.

During use as shown in FIG. 7, the compression of the balance spring 72 will push the intermediate connecting shaft portion 60 up against the body 20, while the compression of the pressed spring 70 will pull the handle 22 downward against the body 20. In addition to gravitational forces and any force provided by the accessory 10, the amount of force pulling the body 20 downward into the mounting recess 14 will equal the difference in force that pressed spring 70 provides in excess of the force provided by balance spring 72. Even when tight, the user can pull up on the accessory 10 a limited distance until the pressed spring 70 bottoms out against the nut 58.

As shown in FIG. 7, the preferred design places six parts all at least partially within the top portion 30 of the step hole mounting recess 14. Starting at the rotational axis 24 and moving outward, these are the bolt 56, the two springs 70, 72, the T-bolt head 18, the intermediate connecting shaft portion 60, and the lower portion of the body 20. Because of the need to accommodate all these parts while simultaneously trying to provide a relatively low profile to the latching mechanism 16 in use, the step hole mounting recess 14 is deeper as a whole and wider (at least at the top portion 30) than prior art mounting recesses.

The interface between the body 20 and the handle 22 is preferably a sloped or conical surface, shown by conical surface 73 having an angle of about 21° below horizontal. The purpose of this slope is to provide "roof-slope" drainage, reducing the entry of muddy water and reducing contact surface wear between the handle 22 and the body 20.

The preferred bolt 56 includes a hexagonal allen screw recess 74 for torqueing so the nut 58 can be tightened thereto. The nut 58 can be advanced at any time to maintain the desired clamping force and axial positioning of the T-bolt head 18 provided by the pressed spring 70 and the balance spring 72. A plug 76 may be positioned over the bolt 56 to cosmetically hide the bolt 56 from view and to help minimize any seepage of water or precipitation through the latching mechanism 16.

Finally, the body 20 may include a threaded side hole 78 for a set screw 80, positioned to mate relative to a notch 82 in the connecting shaft portion 60. Tightening of the set screw 80 into the notch 82 secures the handle 22 against loosening rotation when desired. When the latch mechanism 16 is used for a long period of time, in order to prevent the handle 22 from being moved accidentally or unintentionally opened by being contacted by other objects, the set screw 80 can limit and lock the connecting shaft 60 against rotation.

Although the present invention has been described with reference to preferred embodiments, workers skilled in the art will recognize that changes may be made in form and detail without departing from the spirit and scope of the invention.

The invention claimed is:

1. A latching mechanism for removably attaching an accessory to an offroad vehicle without requiring tools, the latching mechanism comprising:

a body receivable at least partially in a mounting recess of the offroad vehicle such that the body is held against rotation by the mounting recess;

a shaft extending through the body, pivotable about a rotational axis;

a handle for rotating the shaft relative to the body, the handle extending on an upper side of the body so as to be hand manipulatable by a user while the body is at least partially in the mounting recess;

an oblong head rotatable by the shaft about the rotational axis, the head extending on a lower side of the body and rotatable to a position where the head secures the body relative to the mounting recess; and a spring system for biasing the head axially, such that the head can be moved either upwardly or downwardly from a balanced elevation, and when moved upwardly relative to the body the head is moved against a downward biasing force of the spring system and when moved downwardly relative to the body the head is moved against an upward biasing force of the spring system.

2. The latching mechanism of claim 1, wherein the body comprises a hooking portion extending upwardly above the mounting recess, the hooking portion for mating with the accessory at a location a clamping distance above a surface of the vehicle to which the accessory is mounted.

3. The latching mechanism of claim 2, in which the hooking portion comprises two prongs.

4. The latching mechanism of claim 3, in which the two prongs extend about a common prong axis, the prong axis being horizontal when the rotational axis is vertical, the prong axis being laterally offset from the rotational axis.

5. The latching mechanism of claim 1, in which the spring system comprises two springs, one for biasing the head downwardly, and one for biasing the head upwardly.

6. The latching mechanism of claim 5, in which the shaft comprises an intermediate connecting shaft portion about a bolt, with the oblong head held onto the bolt by a nut.

7. The latching mechanism of claim 6, in which one of the two springs separate the nut from the oblong head, and in which the other of the two springs separate the oblong head from the intermediate connecting shaft portion.

8. The latching mechanism of claim 6, in which the intermediate connecting shaft portion includes a first splined connection to the handle and a second splined connection to the oblong head, with at least one of the first and second splined connections being within the mounting recess while the latching mechanism is in use tightened into the mounting recess.

9. The latching mechanism of claim 1, wherein the handle contacts the body on a slanted contact surface relative to the rotational axis.

10. The latching mechanism of claim 1 in which the body is generally cylindrical about the rotational axis, with at least one flat of the body mating with a flat of the mounting recess to keep the body from rotating when the handle is moved between a tightened and a loosened position.

11. The latching mechanism of claim 1, further comprising a set screw received in the body, in which the set screw can be tightened by a tool to prevent the shaft from rotating relative to the body.

12. A latching mechanism for removably attaching an accessory to an offroad vehicle without requiring tools, the latching mechanism comprising:

a body defining a rotational axis, the body being receivable at least partially in a mounting recess of the offroad vehicle such that the body is held against rotation by the mounting recess, wherein the body comprises a hooking portion extending upwardly above the mounting recess, the hooking portion having two prongs for mating with the accessory at a location a clamping distance above a surface of the vehicle to which the accessory is mounted, the two prongs extending about a common prong axis, the prong axis being horizontal when the rotational axis is vertical, the prong axis being laterally offset from the rotational axis;

a shaft extending through the body, pivotable relative to the body and about the rotational axis;

a handle for pivoting the shaft relative to the body, the handle extending on an upper side of the body so as to be hand manipulatable by a user while the body is at least partially in the mounting recess; and an oblong head pivotable by the shaft about the rotational axis, the head extending on a lower side of the body and pivotable to a position where the head secures the body relative to the mounting recess.

13. The latching mechanism of claim 12, further comprising a set screw received in the body, in which the set screw can be tightened by a tool to prevent the shaft from pivoting relative to the body.

14. The latching mechanism of claim 12, wherein the body has a conical upper surface, and wherein the handle has a conical lower surface contacting the conical upper surface of the body, the conical upper surface of the body being sloped downwardly and outwardly from the rotational axis so as to reduce entry of muddy water and reduce contact surface wear between the handle and the body.

15. The latching mechanism of claim 12, wherein the two prongs extend over a length which is within a range of ½ to five times the clamping distance in each direction.

16. A latching mechanism system which can be used without requiring tools, the latching mechanism system comprising:

an offroad vehicle defining a mounting recess adjacent a mounting surface;

a latching mechanism comprising:

a body defining a rotational axis, the body being receivable at least partially in the mounting recess of the offroad vehicle such that the body is held against rotation by the mounting recess, wherein the body comprises a hooking portion extending upwardly a clamping distance above the mounting surface when the body is received in the mounting recess, the hooking portion being laterally offset from the rotational axis;

a shaft extending through the body, pivotable relative to the body and about the rotational axis;

a handle for pivoting the shaft relative to the body, the handle extending on an upper side of the body so as to be hand manipulatable by a user while the body is at least partially in the mounting recess; and an oblong head pivotable by the shaft about the rotational axis, the head extending on a lower side of the body and pivotable to a position where the head secures the body relative to the mounting recess; and an accessory removably attachable against the mounting surface of the offroad vehicle by the latching mechanism when the latching mechanism is tightened into the mounting recess by hand pivoting of the handle to pivot the shaft and oblong head relative to the body, the accessory having a hook receiving portion which receives and contacts the hooking portion of the latching mechanism, wherein, when removably attached by the tightened latching mechanism, the accessory makes no contact with the latching mechanism on a side of the rotational axis opposite the hooking portion.

17. The latching mechanism system of claim 16, wherein the hooking portion of the latching mechanism makes contact with the hook receiving portion of the accessory at a location offset from the rotational axis by an offset distance which is within a range of ½ to twice the clamping distance.

18. The latching mechanism system of claim 16, wherein the hooking portion comprises two prongs each extending over a length which is within a range of ½ to five times the clamping distance.

* * * * *